United States Patent [19]
Autenrieth et al.

[11] Patent Number: 6,074,770
[45] Date of Patent: Jun. 13, 2000

[54] PROCESS FOR OPERATING A METHANOL REFORMING APPARATUS

[75] Inventors: Rainer Autenrieth, Erbach; Andreas Christen, Kehr; Martin Schuessler, Ulm; Otto Krumberger, Mannheim, all of Germany

[73] Assignees: DBB Fuel Cell Engines Gesellschaft mit beschraenkter Haftung; BASF Aktiengesellschaft, both of Germany

[21] Appl. No.: 09/094,619

[22] Filed: Jun. 15, 1998

[30] Foreign Application Priority Data

Jun. 13, 1997 [DE] Germany ............................ 197 25 008

[51] Int. Cl.⁷ ............................ H01M 8/18; H01M 8/00; B01J 38/10; B01J 20/34
[52] U.S. Cl. ................... 429/19; 429/13; 502/53; 502/54
[58] Field of Search .................... 429/13, 19; 502/53, 502/54

[56] References Cited

U.S. PATENT DOCUMENTS

| | | | |
|---|---|---|---|
| 4,777,156 | 10/1988 | Forbus et al. | 502/53 |
| 4,855,267 | 8/1989 | Cheng | 502/50 |
| 5,075,268 | 12/1991 | Kurashige et al. | 502/52 |

FOREIGN PATENT DOCUMENTS

| | | |
|---|---|---|
| 0 201 070 A2 | 11/1986 | European Pat. Off. . |
| 1 246 688 | 8/1967 | Germany . |
| 33 14 131 A1 | 10/1984 | Germany . |
| 35 31 757 A1 | 3/1986 | Germany . |
| 5 685 | 1/1973 | Japan . |
| 4-122446 | 4/1992 | Japan . |
| 267 603 | 10/1995 | Japan . |

OTHER PUBLICATIONS

Patent Abstracts of Japan, Publication No. 04141234 A, Moriga Takuya et at., Oct. 2, 1990.
Patent Abstracts of Japan, Publication No. 63310703 A, Seya Akitoshi, Jun. 13, 1987.
Patent Abstracts of Japan, Publication No. 63315501 A, Yoshioka Hiroshi et al., Jun. 16, 1987.
Patent Abstracts of Japan, JP–A 630 44 934, Umemoto Matsatsuru, Feb. 25, 1988.
Yoshiaki Nakazaki et al., "Highly Selective Decomposition of Methanol to Syngas on Nickel–Based Composite Catalysts Using an Artifical Intelligence Control Reactor System," *Ind. Eng. Chem. Res.,* 1989, vol. 28, No. 9, pp. 1285–1288 no month available.

*Primary Examiner*—Kathryn Gorgos
*Assistant Examiner*—Edna Wong
*Attorney, Agent, or Firm*—Evenson, McKeown, Edwards & Lenahan, P.L.L.C.

[57] ABSTRACT

A method for the operation of a methanol reforming apparatus wherein, during the operation of the reforming reaction, methanol is reformed in a methanol reforming reactor using a methanol reforming catalyst. The reforming reaction is interrupted at given times for catalyst reactivation phases, during which the reactor containing the methanol reforming catalyst is flushed with hydrogen gas for the activity-regenerating treatment of the methanol reforming catalyst which loses its catalytic activity. The process may be used for the operation of methanol reforming apparatus in fuel-cell-operated motor vehicles for the production of hydrogen from liquid methanol.

7 Claims, No Drawings

PROCESS FOR OPERATING A METHANOL REFORMING APPARATUS

BACKGROUND AND SUMMARY OF THE INVENTION

This application claims the priority of German Patent Document No. 197 25 008.4, filed on Jun. 13, 1997, the disclosure of which is expressly incorporated by reference herein.

The present invention relates to a method for the operation of a methanol reforming apparatus using a methanol reforming catalyst that loses its activity in the reforming reaction, and which comprises interrupting the reforming reaction operation at given times for catalyst reactivation phases.

Methods for reforming methanol are variously known and serve, for example, for the production of hydrogen for the fuel cells of a fuel-cell-operated motor vehicle by means of water vapor reforming of fluid methanol carried with it. A catalytically active Cu/ZnO material on an aluminum oxide support is suitable, for example, as catalyst material. Other usable catalyst compositions are described, for example, in patent applications DE 35 31 757 A1 and EP 0 201 070 A1. Usually the catalyst material is loaded in the form of pellets in bulk into the reforming reaction chamber of the methanol reforming reactor in question.

It is a known fact of current methanol reforming catalysts that, during the reforming reaction process they show a loss of their specific activity. This is especially true in the case of high load operation, such as is desirable in mobile applications, in which use an especially compact construction of the reactor is sought for reasons of space and weight. The reactor is then operated at a corresponding high load so as to achieve the required conversion performance. Frequent replacement of the catalyst material is difficult considering the mobility and service expectations of automobile users.

Various methods are already known for sustaining a high catalytic activity and achieving a long life of the methanol reforming catalyst. Thus, in patent application JP 4-141234 (A) a special formula of various metal oxides is given for the purpose of obtaining a catalyst with a long life and high activity and selectivity.

In patent application JP 63-310703 (A), before the reforming reaction operation is started, the catalyst material is subjected in the reforming reaction chamber of a methanol reforming reactor to a reduction reaction resulting in a shrinkage of the volume of the catalyst. A spring-loaded, movable cover plate holds the catalyst material, charged into the reactor, in a tightly packed form. The reduction reaction is a necessary procedure for the operation of a copper catalyst. The shrinkage that occurs is definitely less than the shrinkage that occurs during normal reforming operations.

In patent application JP 63-315501 (A) the placement of an air chamber between a burner and a reforming reaction chamber is proposed, through which air can be fed in a controlled manner in order to keep the catalyst temperature at a given level.

In a method disclosed in patent application DE 33 14 131 A1, to extend the life of the methanol reforming catalyst the methanol is freed of any chlorine compounds that might be contained in it, before it is brought in contact with the catalyst.

In patent application DE 1 246 688 a method of the kind referred to above is described, in which a methanol-water mixture for the methanol reforming is passed over a nickel catalyst and a zinc-copper catalyst. This reforming operation is periodically interrupted for catalyst treatment phases which consist of a catalyst regeneration phase and, optionally, a subsequent nickel catalyst reactivation phase. The regeneration phase consists in passing a gas which contains free oxygen through the reactor at an elevated temperature of preferably 150° C. to 450° C. The optional nickel catalyst reactivation phase consists in passing a gas containing free hydrogen through the catalyst system at an elevated temperature.

The present invention is addressed to the technical problem of devising a method of the kind referred to above, by which a methanol reforming apparatus can be operated with comparatively little difficulty over longer periods of operation with a reforming conversion output that is not substantially reduced.

The present invention solves this problem by offering the following method for the operation of a methanol reforming apparatus. In this method, the reforming reaction process is interrupted at given points in time, only for catalyst reactivation phases, during which, for the activity-regenerating treatment of the methanol reforming reactor containing the methanol reforming catalyst whose catalytic activity is failing, is purged with hydrogen gas or a hydrogen-rich gas. By the interposition of such reactivation phases the original activity of the catalyst can be restored at least partially, permitting longer periods of operation of the apparatus without markedly losing reforming conversion output and without the need for catalyst replacement. An additional advantage of these reactivation phases is that any unformed portions of the catalyst are formed by the hydrogen gas. The hydrogen gas can originate from the preceding reforming reaction. The reactivation phases can be integrated into normal driving when the apparatus is installed in motor vehicles.

A method that is further developed according to the present invention is intended for methanol reforming apparatus in motor vehicles and provides for starting the catalyst reactivation phases on demand by the driver and/or automatically whenever the vehicle has been standing for a given period of time, especially also when it is idling at a traffic stop light or due to traffic congestion.

As an example representative of numerous additional embodiments of the invention, a methanol reforming apparatus in a fuel-cell-operated motor vehicle is mentioned, with which the hydrogen required for the fuel cells is generated by water vapor reformation of methanol carried in the fuel tank. In the methanol reforming reaction chamber of the corresponding reactor there is a suitable methanol reforming catalyst, e.g., a $Cu/ZnO/Al_2O_3$ catalyst material in the form of bulk pellets.

Such methanol reforming devices are known in various types, and therefore require no further explanation or graphic representation.

In the normal methanol reforming reaction, the apparatus produces the desired amount of hydrogen-rich reformate gas with a sufficiently low CO content. The apparatus is operated during the reforming reaction mostly at maximum load, since it is made as compact as possible to save space and weight. It is precisely due to this type of operation at maximum or nearly maximum loading (i.e., at full load) that a decrease in the specific catalytic activity of the methanol reforming catalyst takes place. In order to assure a comparatively long operation of the apparatus with a high conversion performance without replacing the catalyst, the reforming operation is interrupted at given times for catalyst reactivation phases during which the methanol reforming catalyst is treated to regenerate its activity in order thus to restore its initial activity at least partially.

The activity regenerating treatment of the methanol reforming catalyst consists in flushing the reactor and the catalyst material it contains with hydrogen gas or a gas rich in hydrogen. The rest of the process conditions can be selected in an appropriate manner in accordance with the catalyst material involved, and are then to be maintained in the catalyst reactivation phases. It is found that, with such hydrogen gas flushing, the initial catalyst activity is at least partially restored.

As for the time of the starting of a particular catalyst reactivation phase for the apparatus in the vehicle, several variants are available. For one thing, a driver-controlled start-up can be provided, for example, by means of an appropriate push-button. The driver can then, for example, after shutting off the vehicle, start a catalyst reactivation phase by operating the push-button. In addition to or alternatively to this, an automatic start of the catalyst reactivation phases can be provided, for example, whenever the vehicle is standing for a preset length of time, such as at a traffic stop light or in congested traffic. The occurrence of such stopped phases is automatically detected, and the detection means then starts the catalyst reactivation phase for the methanol reforming apparatus. If necessary, both the automatic and the driver controlled starting of the catalyst reactivation phases can be achieved. In any case it is possible to integrate the catalyst reactivation phases into the driving without having to stop just for this purpose.

Of course, the reactivation phases need to be performed only for as long as it takes to restore the initial catalyst activity to the greatest possible extent or until no substantial increase of activity results. However, the catalyst reactivation phases will end prematurely if this is caused by the driving controlled by the driver, i.e., when the methanol reforming reactor has to be run in the full load mode at the optimum methanol reforming temperature to produce the momentarily needed amount of hydrogen for the fuel cells and thus the reforming reaction has to operate.

The hydrogen used for flushing the reactor in the catalyst reactivation phases can be obtained from the preceding reforming reaction of the system by storing up a portion of the hydrogen produced in these phases of operation in a hydrogen storage tank instead of feeding it to the fuel cells. The stored hydrogen is then available for a later phase of catalyst reactivation.

Flushing the reactor with hydrogen gas during the catalyst reactivation phase and the resultant contact between the catalyst material and the hydrogen flowing past it has the additional advantageous effect that parts of the catalyst material, which are possibly still in the unformed state and are therefore catalytically passive, become formed by the hydrogen and can thus develop their catalytic action in the next reforming reaction.

The above description of an advantageous embodiment of the process shows that with the method of the invention a methanol reforming apparatus can be operated for comparatively long periods with substantially the same high catalyst activity and reforming power, even if the apparatus is operated mostly in the full-load range. Any more frequent replacement of the catalyst material in the reactor is unnecessary due to the activity-regenerating treatments of the methanol reforming catalyst during the catalyst reactivation phases, and when the apparatus is used in a motor vehicle these reaction phases can be performed without disturbing the regular driving of the vehicle. This fulfills the mobility and service expectations to which drivers of motor vehicles have been accustomed in the past, thus avoiding acceptance problems in this regard.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for the operation of a methanol reforming apparatus in a motor vehicle, comprising:
   catalytically reforming methanol in a reactor with a methanol reforming catalyst; and
   interrupting the reforming reaction operation for catalyst reactivation phases, which phases consist of flushing the reactor with hydrogen gas or a gas rich in hydrogen for activity-regenerating treatment of the methanol reforming catalyst,
   wherein a catalyst reactivation phase is implemented by a driver of the motor vehicle or occurs automatically when the vehicle is at rest for longer than a preset time period.

2. The method according to claim 1, further comprising storing hydrogen from the reforming reaction and using stored hydrogen in said catalyst reactivation phases.

3. The method according to claim 1, wherein the at rest phase is when the motor vehicle is idling.

4. The method according to claim 1, wherein the at rest phase has a preset length of time.

5. The method according to claim 1, wherein the catalyst is a $Cu/ZnO/Al_2O_3$ catalyst.

6. A method according to claim 1, wherein said reforming is water vapor reforming of methanol.

7. A method according to claim 1, wherein said catalyst reactivation phases partially restore the activity of the methanol reforming catalyst.

* * * * *